United States Patent
Pyun et al.

(10) Patent No.: US 9,396,918 B2
(45) Date of Patent: Jul. 19, 2016

(54) SAMPLE PLATE USING MALDI-TOF MASS SPECTROMETER AND MANUFACTURING METHOD OF THE SAMPLE PLATE

(71) Applicant: Industry-Academic Cooperation Foundation, Yonsei University, Seoul (KR)

(72) Inventors: Jaechul Pyun, Seoul (KR); Jo Il Kim, Seoul (KR)

(73) Assignee: University-Industry Foundation(UIF), Yonsei University, Seoul (KR)

( * ) Notice: Subject to any disclaimer, the term of this patent is extended or adjusted under 35 U.S.C. 154(b) by 0 days.

(21) Appl. No.: 14/534,335

(22) Filed: Nov. 6, 2014

(65) Prior Publication Data

US 2015/0123012 A1  May 7, 2015

(30) Foreign Application Priority Data

Nov. 6, 2013  (KR) ........................ 10-2013-0134071

(51) Int. Cl.
*H01J 49/04*   (2006.01)
*H01J 49/16*   (2006.01)
*C08G 61/02*   (2006.01)

(52) U.S. Cl.
CPC ........... *H01J 49/0418* (2013.01); *H01J 49/164* (2013.01); *C08G 61/025* (2013.01)

(58) Field of Classification Search
USPC ........................................ 250/281, 282, 288
See application file for complete search history.

(56) References Cited

U.S. PATENT DOCUMENTS

| | | | |
|---|---|---|---|
| 2003/0027354 A1* | 2/2003 | Geli | 436/178 |
| 2004/0094705 A1* | 5/2004 | Wood | H01J 49/164 250/288 |
| 2004/0248108 A1* | 12/2004 | Lakshmi et al. | 435/6 |

* cited by examiner

*Primary Examiner* — Nicole Ippolito
(74) *Attorney, Agent, or Firm* — Lex IP Meister, PLLC (57) ABSTRACT

A sample plate in use with a MALDI-TOF (matrix-assisted laser desorption ionization time-of-flight) mass spectrometer. The sample plate is usable for the mass spectrometry of a polymeric material on the order of several hundreds of Da and a method of manufacturing the same sample plate. The sample plate including a target plate, an organic matrix formed on one surface of the target plate, and a Parylene thin film formed on the target plate on which the organic matrix is formed, the Parylene thin film entirely covering the organic matrix.

9 Claims, 6 Drawing Sheets

SAMPLE PLATE USING MALDI-TOF MASS SPECTROMETER AND MANUFACTURING METHOD OF THE SAMPLE PLATE

CROSS-REFERENCES TO RELATED APPLICATION

This application claims priority to Korean Patent Application No. 10-2013-0134071 filed on Nov. 6, 2013, the contents of which are incorporated herein by reference.

BACKGROUND OF THE INVENTION

1. Field of the Invention

The present invention relates to a sample plate in use with a MALDI-TOF (matrix-assisted laser desorption ionization time-of-flight) mass spectrometer, and more particularly, to a sample plate usable for the mass spectrometry of a polymeric material on the order of several hundreds of Da and a method of manufacturing the same sample plate.

2. Description of Related Art

In general, mass spectrometers are analytical instruments that measure the mass of a compound, and more particularly, determine the molecular weight of the compound by charging and ionizing the compound and subsequently measuring a mass-to-charge ratio. Methods of ionizing a compound known in the art include an electron ionization method using an electron beam, a method of colliding high-speed atoms against each other, a method using a laser, and the like.

The method of using a laser among these methods includes mixing an ionization-assisting matrix with a compound (sample), forming a target including the mixture, and radiating a laser beam onto the target. This method ionizes the sample using the characteristics of the sample in that it is easily ionized with the assistance of the matrix. It is advantageous in that this method can measure the molecular weight of a polymeric material, analyze a sample on the order of peptomol due to high sensitivity, and significantly reduce the phenomenon in which a compound to be analyzed is fractured during ionization. Therefore, the MALDI-TOF mass spectrometry using a laser is effective for biochemical materials having a large molecular weight such as proteins and hexanes, and MALDI-TOF mass spectrometers are currently being commercialized.

However, this method has a drawback in that different matrix materials must be determined depending on the types of samples since the samples are ionized using a matrix. In addition, a typical matrix material has a molecular weight of hundreds of Da. When the molecular weight of a compound to be analyzed is similar to that of the matrix material, the mass spectrum reflects the decomposed matters of the matrix material. It is therefore difficult to use the MALDI-TOF mass spectrometry for compounds having a molecular weight of hundreds of Da.

In order to overcome these problems, a MALDI-TOF mass spectrometry using a metal nanowire instead of the matrix was proposed, for example, in Korean Patent Application Publication No. 10-2005-92809 and 10-2012-95638. The MALDI-TOF mass spectrometry using the metal nanowire is based on the principle of forming nanowire spots by growing a plurality of nanowires on a specific area of a conductor or semiconductor substrate, placing a compound (sample) to be subjected to mass spectrometry on the nanowire spots, drying the compound, and subsequently transferring energy to the sample through the nanowire by radiating a laser beam onto the nanowire spots, such that the sample is attached/detached and ionized.

However, when this method is used, the nanowires are grown by blowing a material to be grown into the nanowires as a vapor precursor along with a high-temperature and high-pressure carrier gas onto a metal catalyst on the substrate. This method is commonly referred to as vapor liquid solid (VLS) synthesis. However, the process of placing an array of metal catalyst on the substrate must be performed in advance in order to form a nanowire array using the VLS synthesis. However, the process of placing an array of metal catalyst has a high degree of difficulty and thus is rarely applied to mass production. In addition, the VLS synthesis is carried out within a high-temperature and high-pressure quartz tube, thereby increasing manufacturing costs and making mass production difficult.

The information disclosed in the Background of the Invention section is provided only for better understanding of the background of the invention and should not be taken as an acknowledgment or any form of suggestion that this information forms a prior art that would already be known to a person skilled in the art.

RELATED ART DOCUMENT

Patent Document 1: Korean Patent Application Publication No. 10-2005-92809
Patent Document 2: Korean Patent Application Publication No. 10-2012-95638

BRIEF SUMMARY OF THE INVENTION

Various aspects of the present invention provide a sample plate in use with a MALDI-TOF (matrix-assisted laser desorption ionization time-of-flight) mass spectrometer that is used for the mass spectrometry of a polymeric material, and more particularly, to a sample plate particularly suitable for the mass spectrometry of a compound having a molecular weight of several hundreds of Da.

Also provided is a sample plate including an existing organic matrix able to substitute for a sample plate including nanowires that is difficult to fabricate. The sample plate also enables accurate mass spectrometry of a compound having a molecular weight of several hundreds of Da.

In an aspect of the present invention, provided is a sample plate including: a target plate; an organic matrix formed on one surface of the target plate; and a Parylene thin film formed on the target plate on which the organic matrix is formed, the Parylene thin film entirely covering the organic matrix.

The sample plate may further include a subject to be analyzed formed on the Parylene thin film.

The Parylene thin film may be a Parylene-N thin film.

The Parylene thin film may be a deposition film having a thickness ranging from 10 to 100 nm.

The molecular weight of the subject to be analyzed may range from 100 to 1,000 Da.

The sample plate may be in use with a MALDI-TOF mass spectrometer.

In another aspect of the present invention, provided is a method of manufacturing a sample plate including the following steps of: forming an organic matrix on one surface of a target plate; and forming a Parylene thin film on the target plate on which the organic matrix is formed such that the Parylene thin film entirely covers the organic matrix.

The method may further include the step of forming a subject to be analyzed on the Parylene thin film.

The Parylene thin film may be a Parylene-N thin film.

The Parylene thin film may be deposited at a thickness ranging from 10 to 100 nm.

The step of forming the Parylene thin film may include: evaporating Parylene by heating a Parylene dimer; forming an intermediate by pyrolyzing the evaporated Parylene dimer; and introducing the intermediate into a deposition chamber, thereby depositing a Parylene thin film on the target plate on which the organic matrix is formed.

According to the present invention as set forth above, when a laser beam is radiated on the sample plate, the degree of the ionization of the compound to be analyzed is similar to that of the case where the organic matrix and the compound are mixed but no components of the organic matrix arrive at the detector by passing through the Parylene thin film. All of the ions colliding against the detector are the ions of the subject to be analyzed, thereby making it possible to accurately detect the type of the compound to be analyzed.

The methods and apparatuses of the present invention have other features and advantages that will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to a sample plate and a method of manufacturing the same according to the present invention, various embodiments of which are illustrated in the accompanying drawings and described below. While the present invention will be described in conjunction with exemplary embodiments thereof, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Figure 1A:
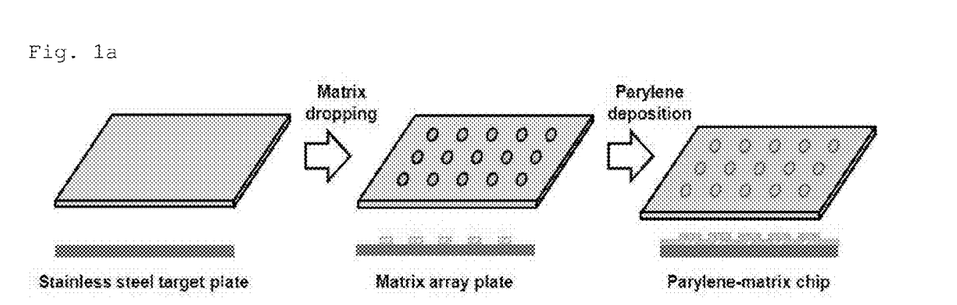
FIG. 1A schematically illustrates the process of forming a sample plate according to an exemplary embodiment of the present invention.
Figure 1B:
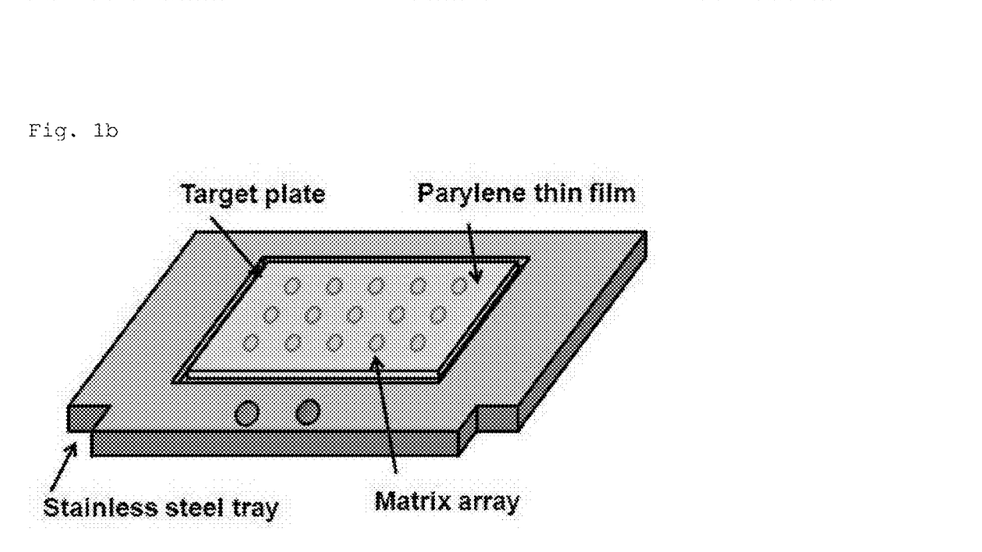
FIG. 1B schematically illustrates the structure of the sample plate produced by the method illustrated in FIG. 1A.

FIG. 1A schematically illustrates the process of forming a sample plate according to an exemplary embodiment of the present invention, and FIG. 1B schematically illustrates the structure of the sample plate produced by the method illustrated in FIG. 1A.

As illustrated in FIG. 1A and FIG. 1B, first, a target plate to be used in a MALDI-TOF (matrix-assisted laser desorption ionization time-of-flight) mass spectrometer is prepared. The target plate is typically formed of metal, and more particularly, stainless steel, but the present invention is not limited thereto.

Afterwards, an organic matrix is formed by dropping an organic matrix solution onto the target matrix and drying the resultant structure. An experiment according to this exemplary embodiment of the present invention used an organic matrix solution in which α-ciano-4-hydroxycinnamic acid (CHCA) was dissolved at a concentration of 10 mg/ml into acetonitrile/water (1:1) to which 0.1% trifluoroacetic acid was added in order to form an organic matrix of α-ciano-4-hydroxycinnamic acid (CHCA). However, it should be understood that the present invention is not limited to the above-described solution and the organic matrix solution may be variously selected depending on the types of compounds to be analyzed.

Thereafter, a Parylene thin film is deposited on a target plate containing the organic matrix.

Parylene™ (hereinafter, "Parylene") is the trade name for a variety of chemical vapor deposited poly(p-xylylene) polymers. Parylene is applicable in a variety of fields since it is transparent, waterproof, fire resistant and corrosion resistant. In addition, Parylene generally deposited on a substrate typically indicates p-xylylene dimer, and is commonly referred to as Parylene N.

Figure 2:
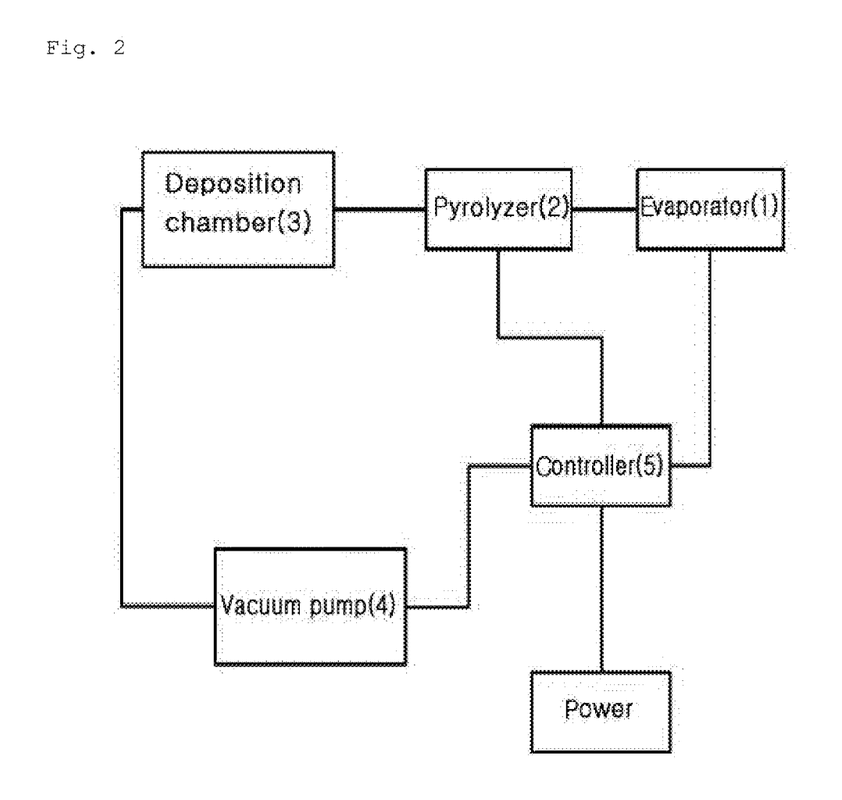
FIG. 2 is a block diagram illustrating an example of an apparatus for forming a Parylene thin film.

FIG. 2 is a block diagram illustrating an example of an apparatus for forming a Parylene thin film. As illustrated in FIG. 2, the apparatus for forming a Parylene thin film of the related art includes an evaporator 1, a pyrolyzer 2, a deposition chamber 3, a vacuum pump 4 and a controller 5. The evaporator 1 evaporates Parylene by heating Parylene dimer powder. The pyrolyzer 2 pyrolyzes the evaporated Parylene dimer gas at a high temperature, thereby forming a high-reactivity p-xylene radical as an intermediate. The pyrolyzed high-reactivity p-xylene radical is introduced into the deposition chamber 3. In the deposition chamber 3, the pyrolyzed high-reactivity p-xylene radical is deposited on a substrate in a vacuum. The vacuum pump 4 takes in Parylene monomer gas from the deposition chamber 3, and enables trapping through a cold trap. The controller 5 controls a variety of functions and operations of the apparatus for forming a Parylene thin film. Although not illustrated in FIG. 2, the apparatus for forming a Parylene thin film further includes other parts, such as connector pipes through which the evaporator 1, the pyrolyzer 2, the deposition chamber 3 and the vacuum pump 4 are connected together, and a variety of valves with which the evaporator 1, the pyrolyzer 2, the deposition chamber 3 and the vacuum pump 4 are controlled.

According to this embodiment of the present invention, the method of forming a Parylene thin film includes a first operation of evaporating Parylene dimer into Parylene gas, a second operation of forming an intermediate by pyrolyzing the evaporated Parylene dimer, and a third operation of introducing the intermediate into the deposition chamber and depositing a Parylene thin film on a substrate seated within the deposition chamber.

Specifically, it is preferable that the Parylene dimer evaporated at the first operation is Parylene dimer powder for the purpose of efficient evaporation. In this case, the Parylene dimer powder is evaporated at a temperature of 100° C. or higher, and preferably, ranging from 140° C. to 180° C., such that the Parylene dimer powder directly evaporates without liquefaction.

In addition, at the second operation, the Parylene dimer gas is pyrolyzed at a temperature of 600° C. or higher, and preferably, 650° C. or higher. Through the pyrolysis, the Parylene dimer powder forms an intermediate. When Parylene N is pyrolyzed, a high-reactivity p-xylene radical is formed as an intermediate.

Furthermore, at the third operation, the pyrolyzed intermediate is introduced into the deposition chamber, and is deposited on a substrate disposed within the deposition chamber, thereby forming a Parylene thin film. It is preferable that the formation of the Parylene thin film is carried out in vacuum and room-temperature conditions.

According to this embodiment of the present invention, the substrate disposed within the deposition chamber forms a target plate in which an organic matrix is contained.

Since the Parylene thin film is deposited in a gaseous state, it is advantageous in that the deposition can be uniformly carried out regardless of the shape of the substrate. In addition, since Parylene has a low thin film growth rate, Parylene can be manufactured to form a thin film in a thickness of tens of nanometers. The resultant thin film has uniform and dense surface properties, leading to superior waterproof and electrical insulation characteristics.

However, it will be apparent to a person skilled in the art that the present invention is not limited to the above-described method according to this embodiment and the Parylene thin film may be formed by a variety of methods other than the above-described method.

In addition, it is possible to carry out mass spectrometry by forming form a compound to be analyzed in the top portion of an organic matrix in a target plate on which a Parylene thin film is deposited and placing the target plate at a designated position on the MALDI-TOF mass spectrometer. The compound is formed, for example, by mixing a compound (sample) to be analyzed with a solution, placing the sample on a Parylene thin film in which an organic matrix is formed, and subsequently drying and crystallizing the sample solution.

Figure 3:
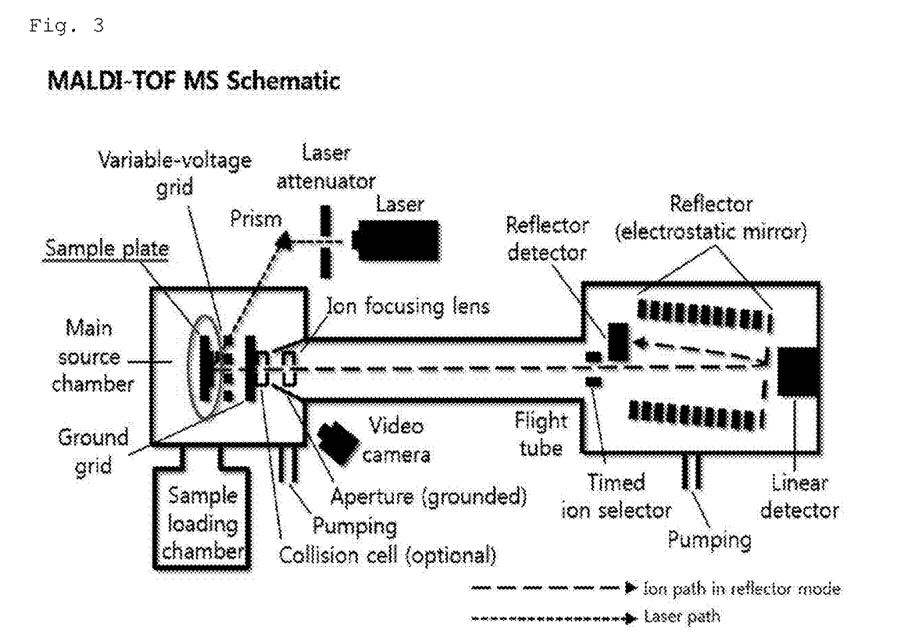
FIG. 3 illustrates an example of the structure of a MALDI-TOF mass spectrometer used according to an exemplary embodiment of the present invention.

A description will be given below of a mass spectrometry method on a sample using a nano web matrix in which nano particles formed according to the foregoing embodiment are fixed. FIG. 3 illustrates an example of the structure of a MALDI-TOF mass spectrometer used according to an exemplary embodiment of the present invention.

Sequentially, after the sample plate is placed at a designated position (marked as a sample plate) of a main chamber of a mass spectrometer illustrated in FIG. 3, a laser beam is emitted from a laser device. The laser radiated on the surface of the sample plate ionizes a portion of the compound that is to be analyzed, and the ionized sample is accelerated by an electric field to pass through a flight tube. After having passed through the flight tube, the ionized sample collides against a detector, and the mass spectrometer can detect the mass of the compound by calculating an elapsed time for the ionized sample from the surface of the sample plate to collide against the detector.

Figure 4A:
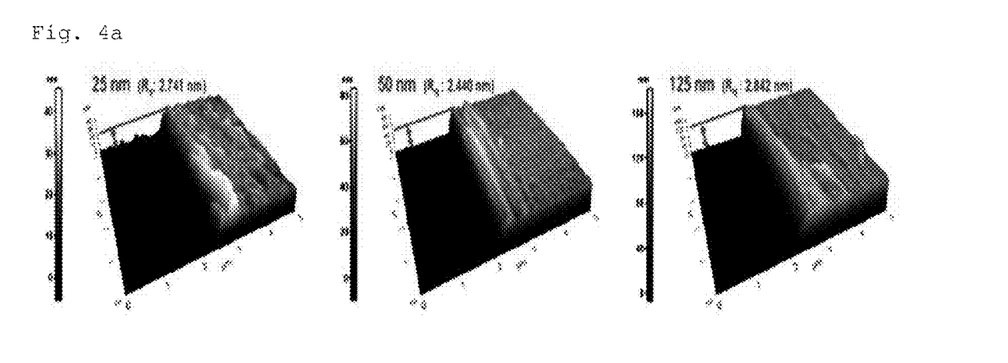
FIG. 4A illustrates an atomic force microscopy (AFM) image of sample plates according to examples of the invention, in which Parylene thin film are 25, 50 and 125 nm thick, respectively.
Figure 4B:
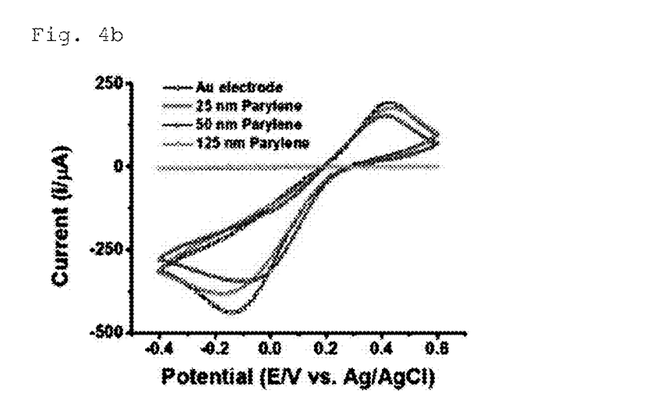
FIG. 4B illustrates the results of measurements of cyclic voltammetry using Au electrodes coated with Parylene-N thin films.

FIG. 4A illustrates an atomic force microscopy (AFM) image of sample plates according to examples of the invention, in which Parylene thin film are 25, 50 and 125 nm thick, respectively, and FIG. 4B illustrates the results of measurements of cyclic voltammetry using Au electrodes coated with Parylene-N thin films using the redox coupling of ferricyanide ($Fe(CN)_6^{3-/4-}$).

Figure 5:
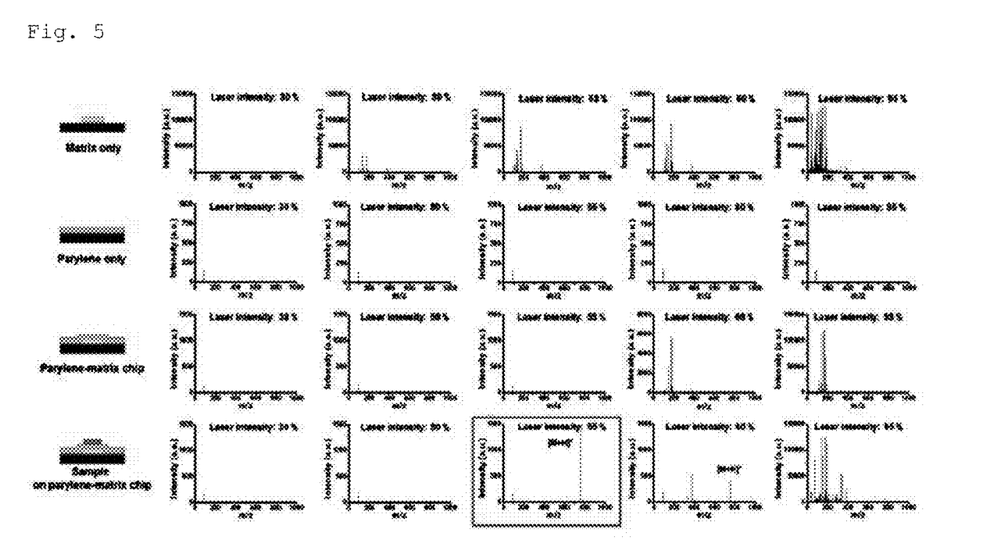
FIG. 5 illustrates the results of mass spectrometry of sample plates manufactured by a variety of methods.

FIG. 5 illustrates the results of mass spectrometry using a MALDI-TOF mass spectrometer in cases where (a) only an organic matrix was formed on a target plate, (b) only a Parylene thin film was formed, (c) a Parylene thin film was formed on an organic matrix, and (d) both a Parylene thin film and a compound as a subject to be analyzed were formed on an organic matrix. The mass spectrometry was performed by radiating laser beams having various levels of intensity (30%, 50%, 55%, 60% and 95%) onto the samples. The organic matrix used in FIG. 5 was α-ciano-4-hydroxycinnamic acid (CHCA), and the compound to be analyzed was a model peptide (bradykinin piece having a molecular weight of 756.4 g/mol).

As illustrated in FIG. 5 (a), in the case where only the organic matrix was formed on the target plate, the organic matrix was ionized and detected in response to a laser beam being emitted from the MALDI-TOF mass spectrometer. Thus, a variety of components of the organic matrix having a molecular weight on the order of several hundreds of Da were detected. In addition, as illustrated in FIG. 5 (b), in the case where only the Parylene thin film was formed, it was appreciated that substantially no components are detected as being ionized in response to a laser beam being emitted from the MALDI-TOF mass spectrometer.

In addition, as illustrated in FIG. 5 (c), in the case where the Parylene thin film was formed on the organic matrix, it is appreciated that substantially no components are detected as being ionized in response to a laser beam being emitted from the MALDI-TOF mass spectrometer, similar to that of the case of FIG. 5 (b). This indicates that no components of the organic matrix are ionized or, even if any components of the organic matrix are ionized, no ionized components arrived at the detector through the Parylene thin film to be detected by the detector.

Furthermore, as illustrated in FIG. 5 (d), in the case where both the Parylene thin film and the compound to be analyzed were formed on an organic matrix, it was appreciated that the subject to the analyzed had a significantly-high peak in the molecular weight, whereas the components of the organic matrix had no peak in the molecular weight. This explains that the subject to be analyzed is effectively ionized by the organic matrix but no components of the organic matrix were ionized or even if any components of the organic matrix are ionized, no ionized components arrived at the detector through the Parylene thin film to be detected by the detector.

Figure 6A:
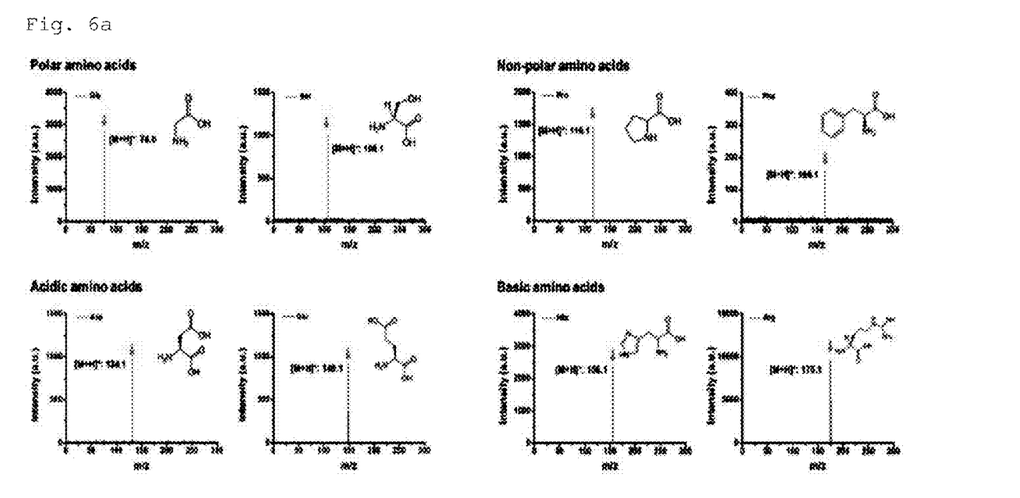
FIG. 6A and FIG. 6B illustrate the results of mass spectrometry performed on compounds having a variety of molecular weights using sample plates according to examples of the invention.
Figure 6B:
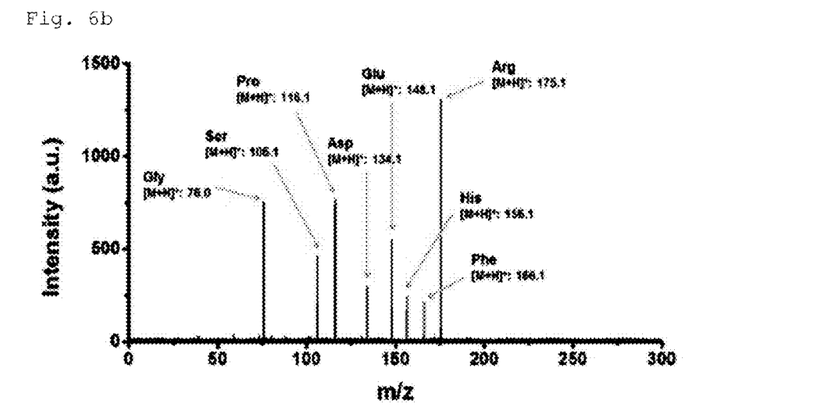

FIG. 6A and FIG. 6B illustrate the results obtained by forming Parylene thin films on sample plates according to examples of the invention, i.e. organic matrices, forming compounds as subjects to be analyzed on the Parylene thin films by a variety of methods, and measuring the molecular weights. The compounds used in these examples were polar substance (glamin or serine), non-polar substance (proline or phenylalanine), acid (aspartic acid and glutamic acid) and base (histidine or arginine). The compounds were supplied by 1.25 nmol to the spots of the sample matrices, and the intensity of laser beams emitted was fixed to 55%.

FIG. 6A illustrates the results obtained by forming eight compounds on sample plates each having an organic matrix and a Parylene thin film and subsequently measuring the molecular weights. As illustrated in FIG. 6A, it is appreciated that the molecular weight of each of the eight compounds was measured accurately. In addition, FIG. 6B illustrates the results obtained by forming eight compounds on sample plates each having one organic matrix and a Parylene thin film and subsequently measuring the molecular weights. As illustrated in FIG. 6B, it is appreciated that the molecular weights were measured accurately when all of the eight compounds were mixed together. This indicates that the use of the sample plates according to the invention makes it possible to accurately identify the components of compounds each consisting of a variety of components.

In brief, when the related-art sample plate having the mixture of the organic matrix and the compound to be analyzed formed thereon is used, the organic matrix assists in the ionization of the compound. Therefore, when a laser beam is emitted, the compound is easily ionized, thereby increasing the amount of the compound ions colliding against the detector, such that the mass of the compound can be analyzed. However, in this case, when the beam is emitted, the organic matrix is also ionized, such that the ions of the organic matrix are also detected as they collide against the detector. If the molecular weight of the compound to be analyzed is similar to that of the organic matrix, it is impossible to accurately detect the subject to be analyzed.

In contrast, when a laser beam is radiated on the sample plate according to an exemplary embodiment of the invention, the degree of the ionization of the compound to be analyzed is similar to that of the case where the organic matrix and the compound are mixed but no components of the organic matrix arrive at the detector by passing through the Parylene thin film. All of the ions colliding against the detector are the ions of the subject to be analyzed, thereby making it possible to accurately detect the type of the compound to be analyzed.

The foregoing descriptions of the specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable a person skilled in the art to make and utilize various exemplary embodiments of the present invention, as well as various alternatives and modifications thereof. It is intended that the scope of the present invention be defined by the Claims appended hereto and their equivalents.

What is claimed is:

1. A sample plate comprising:
   a target plate;
   an organic matrix formed on one surface of the target plate; and
   a Parylene-N thin film formed on the target plate on which the organic matrix is formed, the Parylene-N thin film entirely covering the organic matrix.

2. The sample plate according to claim 1, further comprising a subject to be analyzed formed on the Parylene-N thin film.

3. The sample plate according to claim 2, wherein a molecular weight of the subject to be analyzed ranges from 100 to 1,000 Da.

4. The sample plate according to claim 1, wherein the Parylene-N thin film comprises a deposition film having a thickness ranging from 10 to 100 nm.

5. The sample plate according to claim 1, wherein the sample plate is to be in use with a MALDI-TOF mass spectrometer.

6. A method of manufacturing a sample plate comprising:
   forming an organic matrix on one surface of a target plate; and
   forming a Parylene-N thin film on the target plate on which the organic matrix is formed such that the Parylene-N thin film entirely covers the organic matrix.

7. The method according to claim 6, further comprising forming a subject to be analyzed on the Parylene-N thin film.

8. The method according to claim 6, wherein the Parylene-N thin film is deposited at a thickness ranging from 10 to 100 nm.

9. The method according to claim 6, wherein forming the Parylene-N thin film comprises:
   evaporating Parylene by heating a Parylene dimer;
   forming an intermediate by pyrolyzing the evaporated Parylene dimer; and
   introducing the intermediate into a deposition chamber, thereby depositing a Parylene-N thin film on the target plate on which the organic matrix is formed.

* * * * *